(12) United States Patent
Kinna

(10) Patent No.: US 12,467,445 B2
(45) Date of Patent: Nov. 11, 2025

(54) SELF-LOCKING MEMBRANE SYSTEM

(71) Applicant: ProMinent GmbH, Heidelberg (DE)

(72) Inventor: Jochen Kinna, Sandhausen (DE)

(73) Assignee: ProMinent GmbH, Heidelberg (DE)

( * ) Notice: Subject to any disclaimer, the term of this patent is extended or adjusted under 35 U.S.C. 154(b) by 241 days.

(21) Appl. No.: 18/362,131

(22) Filed: Jul. 31, 2023

(65) Prior Publication Data
US 2024/0141883 A1     May 2, 2024

(30) Foreign Application Priority Data

Aug. 5, 2022   (DE) .......................... 102022119801.4

(51) Int. Cl.
| | |
|---|---|
| F04B 43/00 | (2006.01) |
| B29L 31/00 | (2006.01) |
| F04B 43/02 | (2006.01) |
| F04B 45/04 | (2006.01) |
| F04B 53/22 | (2006.01) |
| F16J 3/02 | (2006.01) |

(52) U.S. Cl.
CPC ...... *F04B 43/0054* (2013.01); *F04B 43/0009* (2013.01); *F04B 43/009* (2013.01); *F04B 43/02* (2013.01); *F04B 43/026* (2013.01); *F04B 45/04* (2013.01); *F16J 3/02* (2013.01); *B29L 2031/755* (2013.01); *F04B 43/021* (2013.01); *F04B 53/22* (2013.01); *F05C 2201/0481* (2013.01); *F05C 2251/02* (2013.01)

(58) Field of Classification Search
CPC .... F04B 43/0054; F04B 43/02; F04B 43/009; F04B 45/04; F04B 43/026; F04B 43/0009; F16J 3/02; B29L 2031/755
See application file for complete search history.

(56) References Cited

U.S. PATENT DOCUMENTS

| | | | | |
|---|---|---|---|---|
| 2,185,784 A | * | 1/1940 | Corydon | ............. F04B 43/0054 |
| | | | | 92/99 |
| 2,230,595 A | * | 2/1941 | Horton | .................... B60C 23/14 |
| | | | | 92/100 |

(Continued)

FOREIGN PATENT DOCUMENTS

| | | |
|---|---|---|
| CH | 717057 A1 | 7/2021 |
| DE | 2300537 A1 | 7/1973 |

(Continued)

OTHER PUBLICATIONS

Search Report issued on May 15, 2023, in corresponding German Application No. 102022119801.4, 8 pages.

*Primary Examiner* — Peter J Bertheaud
(74) *Attorney, Agent, or Firm* — Maier & Maier, PLLC

(57) ABSTRACT

A membrane system comprising a membrane and connecting elements for connecting the membrane to a membrane pump for conveying a fluid, which membrane pump has a drive shaft designed for an oscillating translatory movement perpendicular to the plane of the membrane during operation of the membrane pump and has an external thread at an end portion for engagement with the membrane system by screwing. To ensure a secure and torque-proof connection between the membrane and the connecting element to be screwed to a drive shaft, the connecting elements comprise a threaded socket, a thrust ring and a thrust plate.

9 Claims, 5 Drawing Sheets

(56) References Cited

U.S. PATENT DOCUMENTS

| | | | | |
|---|---|---|---|---|
| 4,238,992 | A | * | 12/1980 | Tuck, Jr. .................. F16J 3/02 |
| | | | | 92/99 |
| 5,649,809 | A | * | 7/1997 | Stapelfeldt ............ F04B 43/026 |
| | | | | 92/138 |
| 5,743,169 | A | * | 4/1998 | Yamada ............ B29C 45/14467 |
| | | | | 92/99 |
| 6,514,177 | B1 | | 2/2003 | Brugger et al. |
| 6,883,417 | B2 | * | 4/2005 | Headley .............. F04B 43/0054 |
| | | | | 92/99 |
| 7,614,338 | B2 | * | 11/2009 | Uehara ............... F04B 43/0054 |
| | | | | 29/888.047 |

FOREIGN PATENT DOCUMENTS

| | | |
|---|---|---|
| DE | 3347538 A1 | 7/1985 |
| DE | 9310414 U1 | 9/1993 |
| DE | 102018109933 A1 | 12/2019 |
| DE | 102020125567 A1 | 3/2022 |
| EP | 0897076 A1 | 2/1999 |
| GB | 1264952 A | 2/1972 |

\* cited by examiner

SELF-LOCKING MEMBRANE SYSTEM

FIELD

The present invention relates to a membrane system having a membrane and connecting elements for connecting the membrane to a membrane pump for pumping a fluid, which has a drive shaft adapted for oscillatory translational movement perpendicular to the plane of the membrane during operation of the membrane pump and has an external thread at an end portion for engagement with the membrane system by screwing.

The invention also comprises a membrane pump for conveying a fluid, in particular a membrane metering pump, which has a membrane system of the type according to the invention and a drive shaft adapted for oscillatory translatory movement perpendicular to the plane of the membrane in operation of the membrane pump and having at an end portion an external thread for engagement with the membrane system by screwing.

BACKGROUND

Membrane pumps for pumping fluids have a pumping chamber with at least one suction port through which the fluid to be pumped is drawn into the pumping chamber from a suction line, and at least one discharge port through which the fluid to be pumped is discharged through a discharge line. Valves are provided at the suction port and at the discharge port which are opened and closed in opposite directions when fluid is sucked in and discharged, i.e., when fluid is sucked in, the valve at the suction port is opened and closed at the discharge port so that fluid is not sucked out of the discharge line back into the pumping chamber, and conversely, when fluid is discharged, the valve at the discharge port is opened and closed at the suction port so that fluid is not forced back into the suction line.

The pumping chamber is separated fluid-tightly by a flexible membrane (pumping membrane) from a working chamber in which means are provided for oscillating the membrane back and forth between a suction stroke position at the end of a suction stroke and a pressure stroke position at the end of a pressure stroke. During the suction stroke, the membrane is moved in the direction of the working chamber, increasing the volume of the pumping chamber, thereby decreasing the pressure in the pumping chamber and drawing fluid through the suction port. On the pressure stroke, the membrane is moved in the opposite direction, decreasing the volume of the pumping chamber again so that the pressure in the pumping chamber increases and fluid is expelled through the discharge port.

The membrane is usually substantially circular disc-shaped and is firmly connected to the housing of the pumping chamber at its peripheral edge in a fluid-tight manner, for example by clamping or sandwiching it between the housing parts of the pumping chamber and the working chamber. During oscillating back and forth movement, the membrane experiences the greatest deflection between the suction stroke position and the pressure stroke position due to its fixation at its circumferential edge in its center. The reciprocating movement of the membrane can be effected in various ways, for example hydraulically by pressure change in the working chamber or also purely mechanically by means of a drive shaft in the working chamber, which performs an oscillating translatory movement perpendicular to the plane of the membrane and is connected on the working chamber side essentially centrally to the circular disk-shaped membrane. When reference is made herein to a drive shaft, this includes any means capable of performing an oscillatory translatory motion perpendicular to the plane of the membrane and transmitting it to the membrane in engagement therewith.

The drive shaft can have a detachable or fixed or non-detachable connection to the membrane in various ways. However, it is advantageous to have a detachable connection between the drive shaft and the membrane so that the membrane can be detached from the drive shaft and replaced in the event of a defect or wear. On the other hand, the connection between the drive shaft and the membrane must be sufficiently secure against unintentional loosening during operation of the membrane pump, as this could result in failure or even destruction of the pump. In addition, the connection between the drive shaft and the membrane should have no or little clearance and ensure precise positioning or deflection of the membrane between the suction stroke position and the pressure stroke position.

For this purpose, a detachable screw connection between the drive shaft and the membrane has proven effective. This is usually achieved by providing an external thread on one end section of the drive shaft for screwing to a corresponding internal thread as a mating thread on a connecting element fixed to the membrane.

Since the membrane is reciprocated in an oscillating manner during operation, it is manufactured from one or more layers of a flexible material, usually a sufficiently flexible polymeric material, but metallic membranes are also used in certain applications. Commonly used elastomer composite membranes usually consist of one or more interconnected layers of a thermoplastic polymer, such as in particular ethylene-propylene-diene (monomer) rubber (EPDM), fluororubber (FKM) or acrylonitrile-butadiene rubber (AB or NBR), and regularly have a fabric embedded in the elastomer, for example a polyamide fabric. On the conveying chamber side, elastomer composite membranes are often provided with a further layer of polytetrafluoroethylene (PTFE; Teflon®). For the connection to the drive shaft of the pump, a connecting element made of metal or a hard polymer, such as polyphenyl ether, which has an internal thread as a mating thread to the external thread on the drive shaft, is connected to the diaphragm material by bonding or in the vulcanization process of the elastomer. Such bonds can be manufactured very stably and with sufficient durability over the life of the elastomer composite membrane.

Membranes have a limited service life due to mechanical stresses, which varies depending on the material and structure of the membrane, the particular application, and the fluid being pumped. Furthermore, when pumping and metering certain aggressive fluids, they are additionally exposed to chemical attack, which can further shorten the service life of elastomer composite membranes in particular due to degradation and/or embrittlement of the elastomer material itself as well as the connections between several membrane layers. Elastomer composite membranes, in particular, must therefore be replaced in some applications after only a few months of operation, resulting in costs for replacement membranes and downtime for membrane replacement.

Membranes manufactured entirely from polytetrafluoroethylene (PTFE; Teflon®) (hereinafter referred to as PTFE, membranes) have proven to be much more durable and long-lasting than conventional elastomer composite membranes in many cases, especially when pumping and metering chemically aggressive fluids due to the chemical resistance of the PTFE material and because the membranes are manufactured from solid PTFE material rather than as a composite of individual membrane layers. The mechanical load capacity of PTFE membranes is as good as that of many elastomer composite membranes. Depending on the intended application, diaphragm pumps are therefore either already equipped with PTFE membranes during manufacture or delivery, or users go over to replacing used elastomer composite membranes with PTFE membranes in order to extend the replacement cycles.

It is therefore necessary, or at least advantageous, for membrane replacement and for flexible usability of the membrane pump if both elastomer composite membranes and PTFE membranes, i.e. membranes made of PTFE solid material, can be used equally in the same membrane pump. This requires that both types of membranes are dimensioned to fit the spatial requirements of the membrane pump without any technical disadvantages for one or the other type of membrane, and that the means for connecting the membrane to the drive shaft also meet the spatial requirements for both types of membrane, but also the requirements for stability during operation and interchangeability when the membrane is changed.

In the case of PTFE membranes, however, these requirements are accompanied by the difficulty that connecting elements cannot be securely fixed to the PTFE material in the same way as to the elastomer materials normally used for membranes, for example by bonding or vulcanization. The PFTE material does not form a stable adhesive bond with metal or with hard polymers suitable for connecting elements.

A stable, in particular torque-proof connection between the membrane and the connecting element for screwing to the drive shaft is also important for replacing the membrane, since the screw connection between the connecting element and the drive shaft is often very difficult to loosen after a certain period of operation by applying a relatively high torque. If the connection between the membrane and the connecting element is not sufficiently torque-stable, this can lead to the connecting element becoming detached from the membrane and remaining on the drive shaft when the membrane is unscrewed for the purpose of membrane replacement.

In a known PTFE membrane, the membrane is manufactured integrally with a trunnion centered on the membrane and extending perpendicular to the plane of the membrane. The trunnion has a circular cross-section and has an external thread (bolt thread) on its circumferential surface. A substantially cylindrical membrane thrust piece made of a hard polymer material, such as polyphenyl ether, is screwed onto the trunnion made of PTFE material. For this purpose, starting from one end of the cylinder, the cylindrical membrane thrust piece has an internal thread which is designed as a mating thread for screwing to the external thread of the trunnion. Starting from the opposite end of the cylindrical membrane thrust piece, a further internal thread is provided, which is designed as a mating thread to the external thread on the drive shaft of a membrane pump and is provided for connecting the membrane to the drive shaft.

A disadvantage of this design is that the cylindrical membrane thrust piece is relatively long, since it must have a thread from each end, on the one hand to receive the external thread on the PTFE, membrane trunnion and on the other hand to receive the external thread on the drive shaft. This required construction depth perpendicular to the plane of the membrane restricts the usability of such PTFE membranes, for example in membrane pumps with limited installation space. The manufacturability of PTFE membranes for replacement with existing elastomer composite membranes is also limited due to the required installation depth, since the connecting element can be designed considerably shorter in the case of elastomer composite membranes because it only requires a thread on one side for connection to the external thread on the drive shaft and can be securely bonded directly to the membrane material on the opposite side.

Another disadvantage of this known design of PTFE membranes is that for torque-proof securing of the membrane thrust piece to the PTFE trunnion, one or more metal bolts or split pins must be driven through one or more holes in the membrane thrust piece into the PTFE material of the trunnion, in particular to ensure that the membrane does not detach from the membrane thrust piece and remain on the thread of the drive shaft when it is unscrewed for disassembly or replacement. The insertion of these bolts or split pins is very costly in the manufacture of the membranes.

SUMMARY

Based on the prior art described, it was therefore an object of the present invention to provide a membrane of the type mentioned above which overcomes the disadvantages of the prior art and ensures a secure and torque-proof connection between the membrane and the connecting element to be bolted to a drive shaft.

According to the invention, this object is solved by a membrane system with a membrane and connecting elements for connecting the membrane to a membrane pump for conveying a fluid, which membrane pump has a drive shaft designed for an oscillating translatory movement perpendicular to the plane of the membrane during operation of the membrane pump and has an external thread at an end portion for engagement with the membrane system by screwing, the connecting elements comprising a threaded socket, a thrust ring and a thrust plate, wherein said threaded socket has a cylindrical portion disposed coaxially with an axis perpendicular to the plane of the membrane, is fixedly or detachably connected to the membrane has on the outer side of the circumferential surface of its cylindrical portion a socket male thread, and has on the inside of the circumferential surface of its cylindrical section a socket female thread, preferably a blind hole thread, wherein the thrust ring has a cylindrical portion arranged coaxially with the cylindrical portion of the threaded socket, and has on the inside of the circumferential surface of its cylindrical portion a thrust ring female thread which is formed as a mating thread to the socket male thread of the threaded socket, wherein the thrust plate has a cylindrical portion arranged coaxially with the cylindrical portion of the threaded socket, on the outer side of the circumferential surface of its cylindrical portion, has a thrust plate male thread formed as a mating thread to the socket female thread of the threaded socket, and on the inside of the circumferential surface of its cylindrical portion, has a thrust plate female thread formed to be connected to the male thread on an end portion of a drive shaft of a membrane pump, wherein the thrust plate male thread of the thrust plate and the socket female thread of the thrust socket formed as a mating thread thereof have a different thread pitch, a different thread rotation direction or both a different thread pitch and a different thread rotation direction than the thrust ring female thread of the thrust ring and the socket male thread of the thrust socket formed as a mating thread thereof, and wherein the thrust plate is connectable or connected to the thrust ring via a connecting portion in a torque-resistant manner.

The threaded socket, thrust ring and thrust plate, which are essential connecting elements according to the invention, serve to connect the membrane to a drive shaft of a membrane pump by screwing. They ensure that the thrust plate with its female thread, which is screwed to the male thread on a drive shaft, is in a torque-resistant relationship to the diaphragm and does not become detached from the diaphragm or the threaded socket on the diaphragm when the diaphragm is unscrewed from the drive shaft and does not remain on the drive shaft, even if loosening the screw connection to the drive shaft is difficult and requires a high torque.

To assemble the membrane system according to the invention, the thrust ring with the thrust ring female thread is first screwed onto the socket male thread of the threaded socket connected to the membrane, preferably until the thrust ring is in contact with the membrane. The thrust plate is then screwed with the thrust plate male thread into the socket female thread of the threaded socket, which is designed as a mating thread to it. The thrust plate is then connected to the thrust ring in a torque-proof manner.

For the torque-proof connection of the thrust plate to the thrust ring, the thrust plate preferably has at least one connecting section extending radially outward from the end of its cylindrical section facing away from the membrane, which extends at least as far as the thrust ring or beyond its end facing away from the membrane. The torque-proof connection of the thrust plate to the thrust ring is made via the connecting section of the thrust plate, preferably by bonding the thrust plate to the thrust ring.

In a preferred embodiment, the connecting section is formed as a circular disc which extends radially outward from the cylindrical section of the thrust plate. The cylindrical section of the thrust plate is thus perpendicular to the circular disc, so that the thrust plate has a substantially hat shape in cross-section.

In an alternative embodiment, two or more connecting portions formed as webs or tabs are provided extending radially outwardly from the cylindrical portion.

In a preferred embodiment, the torque-proof connection of the thrust plate to the thrust ring is an adhesive connection. For this purpose, an adhesive is expediently applied to the thrust ring before the thrust plate is screwed with the thrust plate male thread into the socket female thread of the threaded socket, or at least before the thrust plate is completely screwed in and there is still a distance between the thrust ring and the connecting section or sections of the thrust plate that permits the introduction of adhesive. As soon as the adhesive has cured, the thrust plate and the thrust ring are firmly connected to each other, in particular torque-proof. Expediently, the thrust plate and/or thrust ring further have structures that increase the areas on which the adhesive can spread and adhere for a stronger bond. Furthermore, projections, cutouts and/or undercuts can additionally be provided on the thrust plate and/or thrust ring, which are flowed around by the adhesive in the not yet cured state and, after the adhesive has cured, also provide a positive connection between the thrust plate and thrust ring in addition to further adhesive surfaces formed thereby.

In one embodiment of the invention, the thrust ring has at least one cutout or groove open in the direction of the thrust plate or at least one connecting section of the thrust plate. In the cutout or groove, profiling may also be provided on the wall surfaces, such as elevations, projections, trunnions, recesses or undercuts. If, when bonding the thrust plate to the thrust ring, adhesive is also applied to the cutout or groove on the thrust ring in addition to an application of adhesive to contacting surfaces of the thrust ring and the thrust plate, a particularly stable connection is formed between the thrust ring and the thrust plate after the adhesive has cured, due to the additional bonding surfaces and any profiling present in the cutout or groove.

The invention also includes alternative connections for the torque-proof connection of the thrust plate to the thrust ring, including a welded connection, a bolt connection, a positive connection, a snap-in connection or a combination of two or more of the aforementioned connections.

A welded connection can be manufactured, for example, by ultrasonic welding or laser welding if the connecting portion of the thrust plate and the thrust ring are made of materials that can be welded together, such as thermoplastic polymer. Materials and techniques suitable for this purpose are known in principle, and with knowledge of the present invention, their selection is within the skill of the person skilled in the art.

A bolt connection can be manufactured, for example, by inserting one or more bolts, for example screws, rivets, split pins, etc., into corresponding receptacles or bores with or without threads in the connecting section of the thrust plate and in the thrust ring.

For a positive connection or a latching connection, corresponding structures are provided on the connecting section of the thrust plate and on the thrust ring, for example a toothing with lead-in chamfers on one component and corresponding latching surfaces on the other component, in which the toothing can engage, so that when the thrust plate is screwed with the thrust plate male thread into the socket female thread of the threaded socket between the connecting section of the thrust plate and the thrust ring, a positive or latching engagement takes place. With knowledge of the present invention, the selection and arrangement of appropriate structures is within the skill of the person skilled in the art.

The combination of the torque-proof connection between thrust plate and thrust ring with the different configurations of the threads, namely thrust plate male thread and socket female thread on the one hand and thrust ring female thread and socket male thread on the other hand, achieves self-locking against unscrewing of the thrust plate connected to the thrust ring from the threaded socket. The self-locking prevents the thrust plate from detaching from the membrane or the threaded socket on the membrane when the membrane is unscrewed from the drive shaft of a membrane pump and from remaining on the drive shaft.

In a preferred embodiment of the invention, the threaded socket is fixed to the membrane. Particularly preferably, the threaded socket is manufactured integrally with the membrane from the same material. The one-piece manufacture of the threaded socket with the membrane ensures a secure and tight connection of these two functional elements.

The invention has particular advantages in use with membranes made of PTFE, or other materials that are difficult to bond or weld to the materials of the connecting elements, but it is not restricted in principle to such membrane materials. In a particularly preferred embodiment of the invention, therefore, the membrane is manufactured integrally with the threaded socket from PTFB.

The thrust ring is preferably manufactured from a hard polymer material, which provides structural stability to the thrust ring and ensures a stable threaded connection to the threaded socket. In a preferred embodiment of the invention, the thrust ring is manufactured from polyphenyl ether (PPE) or a derivative thereof, or from a polymer blend comprising polyphenyl ether (PPE) or a derivative thereof, or from a polymer alloy comprising polyphenyl ether (PPE) or a derivative thereof. Preferably, the polymer, polymer blend or polymer alloy is glass fiber reinforced. The use of polyphenyl ether ensures high heat resistance, dimensional stability and dimensional accuracy of the thrust ring made from it. By adding glass fibers, the properties such as hardness, compressive strength and dimensional accuracy of the polymer material can be further in-creased. Thus, in one embodiment of the invention, the thrust ring is manufactured from glass fiber reinforced polyphenyl ether (PPE+GF). In an alternative embodiment, the thrust ring is manufactured from metal or a metal alloy, preferably brass.

The thrust plate is preferably manufactured from metal or a metal alloy, particularly preferably brass, which gives the thrust plate high structural stability and ensures a stable threaded connection with the threaded socket. The metal, for example brass, can be stably and torque-proof connected to the thrust ring made of hard polymer material by means of an adhesive bond.

In an alternative embodiment, the thrust plate, like the thrust ring, is manufactured from a hard polymer material. In this case, the thrust plate can also be manufactured from polyphenyl ether (PPE) or a derivative thereof, or from a polymer blend containing polyphenyl ether (PPE) or a derivative thereof, or from a polymer alloy containing polyphenyl ether (PPE) or a derivative thereof, and preferably also be glass fiber reinforced.

The invention also includes embodiments in which the thrust plate, in addition to the torque-proof connection to the thrust ring, has at least one pin or securing pin extending through the connecting portion of the thrust plate into the cylindrical portion of the threaded socket. This ensures additional torque locking of the thrust plate relative to the threaded socket. In one embodiment, at least one through opening is provided in the connecting section of the thrust plate for such additional securing, through which, after screwing the thrust plate male thread of the thrust plate to the socket female thread of the threaded socket, a bolt or securing pin is passed and inserted, driven or screwed into the material of the threaded socket. For example, if the threaded socket is made of the comparatively soft material PTFE, a bolt can be driven into the material of the threaded socket. Alternatively, a pin with a self-tapping or self-drilling thread can be screwed into the material of the threaded socket and anchored therein.

The invention also includes a membrane pump for conveying a fluid, which has a membrane system according to the invention and a drive shaft adapted for oscillatory translational movement perpendicular to the plane of the membrane during operation of the membrane pump and having an external thread at an end portion for engagement with the membrane system by screwing.

BRIEF DESCRIPTION OF THE FIGURES

Further advantages, features and possible applications of the present invention will become apparent from the following description and the accompanying figures. In the figures, corresponding elements are designated by the same reference signs.

DETAILED DESCRIPTION

Figure 1:
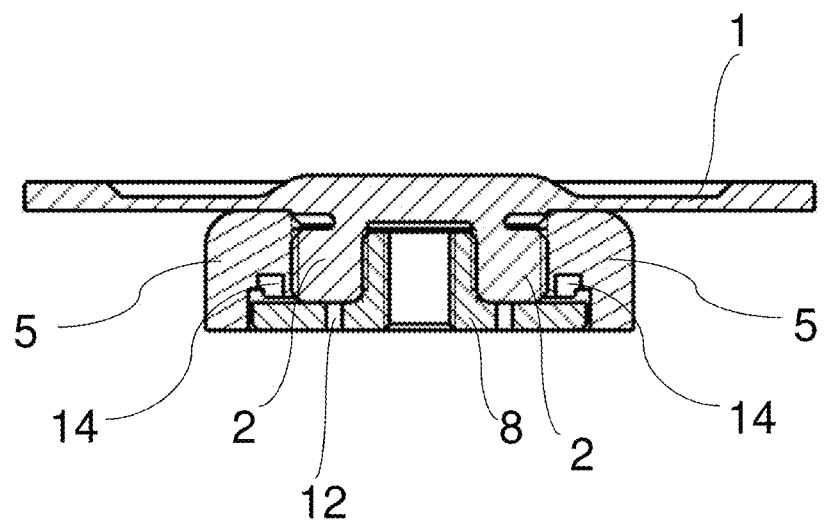
FIG. 1 shows a cross-sectional view of an embodiment of a membrane system according to the invention with a membrane, a threaded socket formed integrally with the membrane, a thrust ring and a thrust plate in assembly.
Figure 2A:
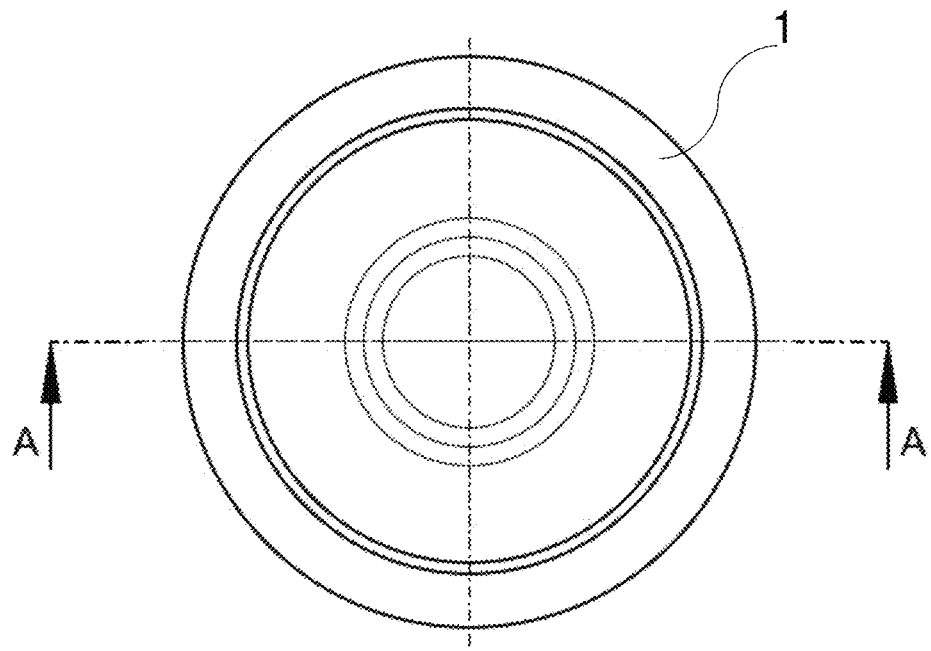
FIG. 2A shows a top view of the membrane with threaded socket integrally formed thereon according to the embodiment shown in FIG. 1.
Figure 2B:
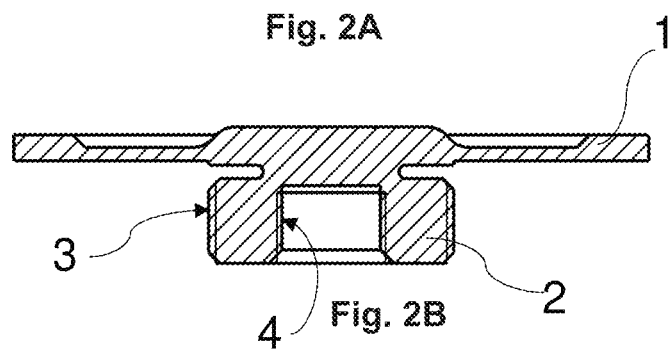
FIG. 2B shows a cross sectional view along A-A of the membrane with threaded socket integrally formed thereon according to the embodiment shown in FIG. 1.
Figure 2C:
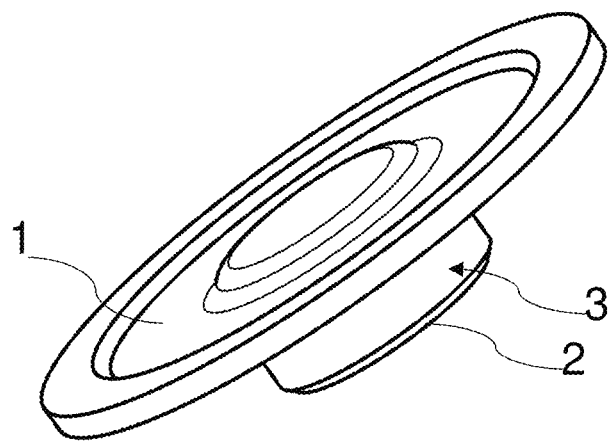
FIG. 2C shows a perspective view of the membrane with threaded socket integrally formed thereon according to the embodiment shown in FIG. 1.
Figure 3A:
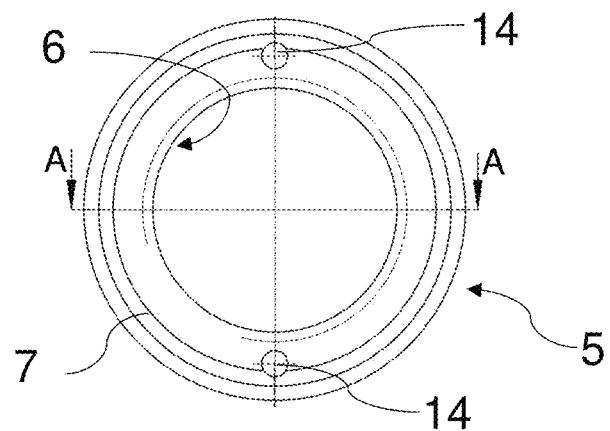
FIG. 3A shows a bottom view of the thrust ring according to the embodiment shown in FIG. 1.
Figure 3B:
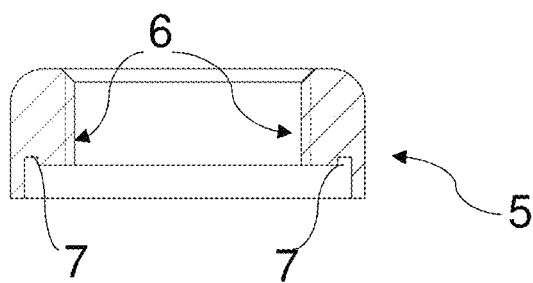
FIG. 3B shows a cross-sectional view along line A-A of the thrust ring according to the embodiment shown in FIG. 1.
Figure 3C:
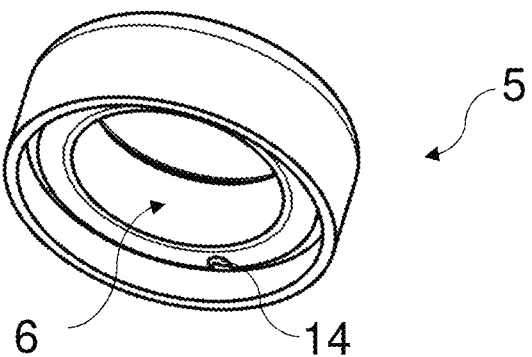
FIG. 3C shows a perspective view of the thrust ring according to the embodiment shown in FIG. 1.
Figure 4A:
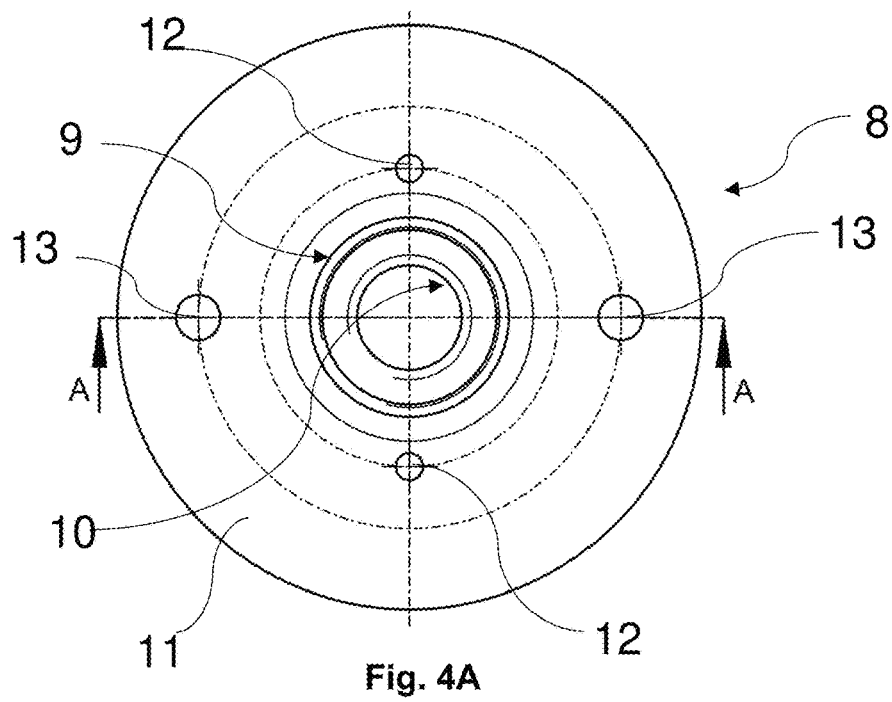
FIG. 4A shows a top view of the thrust plate according to the embodiment shown in FIG. 1.
Figure 4B:
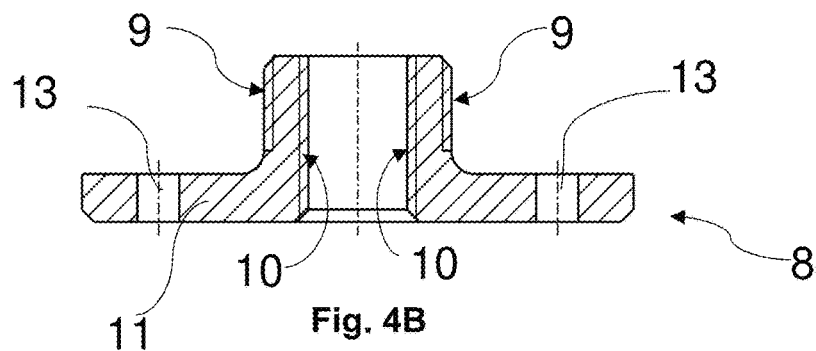
FIG. 4B shows a cross-sectional view along line A-A view of the thrust plate according to the embodiment shown in FIG. 1.
Figure 4C:
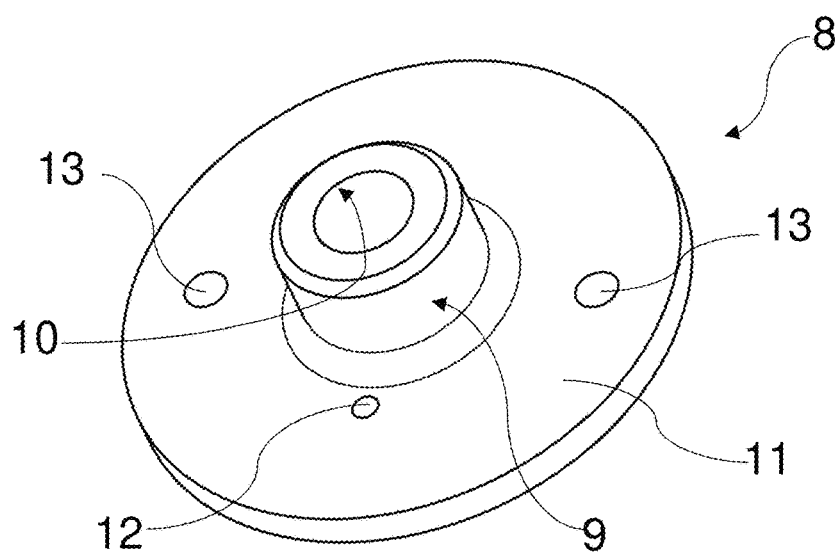
FIG. 4C shows a perspective view of the thrust plate according to the embodiment shown in FIG. 1.

FIGS. 1 to 4 show different representations and views of an embodiment of a membrane system according to the invention with a PTFE membrane 1, a threaded socket 2 formed integrally with the membrane 1 and therefore also made of PTFE, a thrust ring 5 and a thrust plate 8. FIG. 1 shows a cross-sectional view of the membrane system in assembly, while FIGS. 2 to 4 show the components membrane 1 with threaded socket 2, thrust ring 5 and thrust plate 8 connected in FIG. 1, each individually in different views.

The membrane 1 is essentially circular disc-shaped. As can be seen in the cross-sectional view of FIG. 1 and also in FIGS. 2b and 2c, the diaphragm 1 is thicker at its circumferential edge than in sections lying further inward, since the diaphragm is usually connected with its circumferential edge firmly and fluid-tightly to the housing of the pumping chamber of a diaphragm pump by clamping the circumferential edge of the diaphragm between housing parts of the pumping chamber and the working chamber of the diaphragm pump. The sections of the membrane further inwards from the circumferential edge are initially thinner in order to ensure sufficient flexibility and pliability during oscillating back and forth movement of the membrane in operation, the material of the membrane being made stronger again towards the center for a stable and firm structure in the one-piece design with the threaded socket 2 adjoining the membrane 1.

The threaded socket 2 comprises or consists essentially of a cylindrical section coaxial with the axis perpendicular to the plane of the membrane and passing through the center of the membrane. On the outer side of the circumferential surface of its cylindrical section, the threaded socket 2 has a socket male thread 3 for screw connection to the thrust ring 5 and on the opposite inner side of the circumferential surface a socket female thread 4 for screw connection to the thrust plate 8.

The thrust ring 5 comprises a cylindrical section which is arranged coaxially with the cylindrical section of the threaded socket 2 and has, on the inside of the circumferential surface of its cylindrical section, a thrust ring female thread 6 which is designed as a mating thread to the socket male thread 3 for screwing onto the threaded socket 2. In the present embodiment, the thrust ring is manufactured from glass fiber reinforced polyphenyl ether (PPE+GF). The blind holes 14 on the thrust ring 5 shown in FIGS. 1 and 3 serve to engage a tool when screwing the thrust ring onto the threaded socket 2.

The thrust plate 8 also has a cylindrical portion arranged coaxially with the cylindrical portion of the threaded socket 2, and, on the outer side of the circumferential surface of its cylindrical portion, a thrust plate male thread 9 formed as a mating thread to the socket female thread 4 of the threaded socket 2, and, on the inner side of the circumferential surface of its cylindrical portion, a thrust plate female thread 10 formed for connecting with the male thread at an end portion of a drive shaft of a membrane pump.

Furthermore, the cylindrical portion of the thrust plate 8 is adjoined by a connecting portion formed as a circular disk which extends radially outward from the cylindrical portion of the thrust plate 8. The cylindrical portion of the thrust plate is thus perpendicular to the circular disk, so that the thrust plate has a substantially hat shape in cross-section. In the present embodiment, the thrust plate 8 is manufactured from brass.

To assemble the diaphragm system according to the invention, the thrust ring 5 with the thrust ring female thread 6 is first screwed onto the socket male thread 3 of the threaded socket 2 until the thrust ring is in contact with the diaphragm. In the present embodiment, an adhesive connection is manufactured between the thrust plate 8 and thrust ring 5 for the torque-proof connection required by the invention. For this purpose, after screwing the thrust ring 5 onto the threaded socket 2, an adhesive is applied to the thrust ring 5 and then the thrust plate 8 with the thrust plate male thread 9 is screwed into the socket female thread 4 of the threaded socket 2. In the present embodiment, the thrust ring 5 additionally has a circumferential groove 7 open in the direction of the thrust plate 8, into which adhesive is also applied in order to achieve a particularly stable connection between the thrust ring 5 and the thrust plate 8 after the adhesive has cured. Furthermore, in the present embodiment, two additional bores 13 are furthermore provided in the connecting section 11 of the thrust plate 8, into which adhesive can also pene-trate, thus creating additional bonding surfaces and, after the adhesive has cured, also additional sections with a form-fit connection against a rotational movement of the thrust plate 8 relative to the thrust ring 5. Once the adhesive has cured, the thrust plate 8 and the thrust ring 5 are firmly connected to each other, in particular torque-proof.

In the present embodiment, the socket male thread 3 of the thrust ring 2 and the thrust ring female thread 6 of the thrust ring 5 are designed as right-handed M18×1.25 fine pitch threads, while the socket female thread 4 of the thrust ring 2 and the thrust plate male thread 9 of the thrust plate 8 are designed as right-handed M8×0.75 fine pitch threads. The thrust plate female thread 10 for screwing to the drive shaft of a membrane pump is an M5×0.8 standard thread. Alternatively, right-hand and left-hand threads with the same or different thread pitch can be combined.

The combination of the torque-proof connection between thrust plate 8 and thrust ring 5 with the different thread pitches (or also different thread runnings) on the thrust plate male thread 9 and socket female thread 4 on the one hand and thrust ring female thread 6 and socket male thread 9 on the other hand achieves a self-locking effect against the thrust plate 8 connected to thrust ring 5 being unscrewed from the threaded socket 2. The self-locking prevents the thrust plate 8 from detaching from the threaded socket 2 on the diaphragm 1 when the diaphragm is unscrewed from the drive shaft of a diaphragm pump and from remaining on the drive shaft.

In the present embodiment, two through-holes 12 are provided in the circular disc-shaped connecting section 11 of the thrust plate 8, through which bolts or securing pins (not shown here) can be inserted and anchored in the comparatively soft material PTFE of the cylindrical section of the threaded socket 2 to supplement the torque-proof adhesive connection with the thrust ring. This ensures additional torque protection of the thrust plate 8 with respect to the threaded socket 2. Simple metal pins, preferably sharpened for easier driving into the material of the threaded socket 2, or alternatively screws with a self-tapping or self-drilling thread can be con-sidered as bolts or securing pins.

Figure 5A:
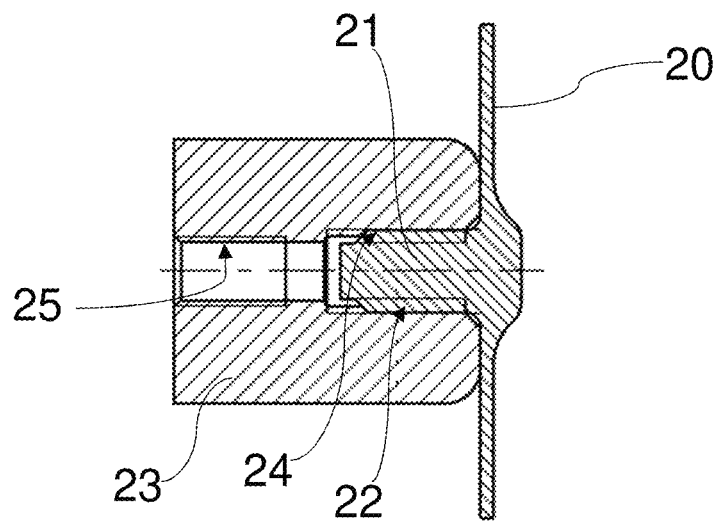
FIG. 5A shows a cross-sectional view of a prior art membrane system with membrane, a trunnion integral with the membrane, and a membrane thrust piece in assembly.
Figure 5B:
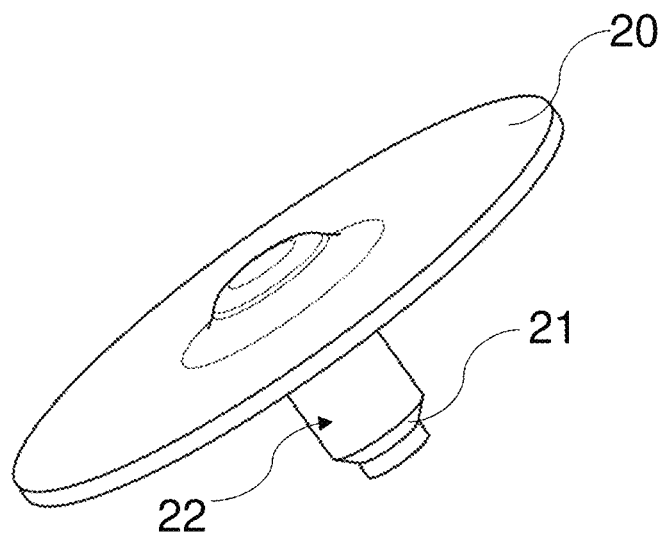
FIG. 5B shows a perspective view of the prior art membrane with trunnion integral therewith.

FIG. 5a shows a cross-sectional view of a membrane system according to the prior art described above with a PTFE membrane 20, which is manufactured in one piece with a trunnion 21 of PTFE arranged centrally on the membrane 20 and extending perpendicular to the plane of the membrane. The trunnion 21 has a circular cross-section and has a trunnion male thread 22 on its circumferential surface. Threaded onto the trunnion 21 made of PTFE is a substantially cylindrical membrane thrust piece 23 made of a hard polymeric material. For this purpose, starting from one end of the cylinder, the cylindrical membrane thrust piece 23 has a first thrust piece female thread 24, which is designed as a mating thread for screwing to the male thread 22 of the trunnion 21. Starting from the opposite end of the cylindrical membrane thrust piece 23, a second thrust piece female thread 25 is provided, which is designed as a mating thread to the male thread on the drive shaft of a membrane pump and is provided for connecting the membrane to the drive shaft. FIG. 5b shows a perspective view of the PTFE membrane 20 with the trunnion 21 manufactured in one piece therewith and extending perpendicular to the plane of the membrane, without the membrane thrust piece fixed thereto.

Since the membrane thrust piece 23 is merely screwed onto the PTFE, trunnion 21, one or more metal bolts or split pins (not shown here) must be driven through one or more holes in the membrane thrust piece (not shown here) into the PTFE material of the trunnion for torque-proof securing of the membrane thrust piece 23 to the PTFE trunnion 21 to ensure that the membrane 20 with the trunnion 21 does not move away from the PTFE, membrane thrust piece 20 when it is unscrewed from a drive shaft for dismantling or from the membrane thrust piece 23 when unscrewing it from a drive shaft for disassembly or replacement, and the latter remains on the thread of the drive shaft.

Comparison of FIGS. 1 and 5 reveals a further disadvantage of the prior art structure, namely that the cylindrical membrane thrust piece 23 must be comparatively long in design since it must receive a thread from each end, which in turn limits the usability of such PTFE membranes.

For purposes of the original disclosure, it is pointed out that all features as they appear to a person skilled in the art from the present description, the drawings and the claims, even if they have been specifically described only in connection with certain further features, can be combined both individually and in any desired combinations with other of the features or groups of features disclosed herein, unless it has been expressly excluded or technical circumstances make such combinations impossible or pointless. The comprehensive, explicit presentation of all conceivable combinations of features is omitted here only for the sake of brevity and readability of the description.

While the invention has been illustrated and described in detail in the drawings and the foregoing description, this description of presentation is by way of example only and is not intended to limit the scope of protection as defined by the claims. The invention is not restricted to the embodiments shown.

Variations of the disclosed embodiments will be obvious to those skilled in the art from the drawings, description and appended claims. In the claims, the word "having" does not exclude other elements, and the indefinite article "one" or "a" does not exclude a plurality. The mere fact that certain features are claimed in different claims does not preclude their combination.

REFERENCE LIST 1 membrane
2 threaded socket
3 socket male thread
4 socket female thread
5 thrust ring
6 thrust ring female thread
7 groove on thrust ring
8 thrust plate
9 thrust plate male thread
10 thrust plate female thread
11 connecting section of thrust plate
12 through hole on the connecting section of the thrust plate
13 holes on thrust plate
14 blind holes for tool engagement on thrust ring
20 membrane
21 trunnion
22 trunnion male thread
23 membrane thrust piece
24 first thrust piece female thread
25 second thrust piece female thread

The invention claimed is:

1. A membrane system comprising a membrane and connecting elements for connecting the membrane to a membrane pump for conveying a fluid, said membrane pump has a drive shaft designed for an oscillating translatory movement perpendicular to the plane of the membrane during operation of the membrane pump and has an external thread at an end portion for engagement with the membrane system by screwing,
wherein the connecting elements comprise a threaded socket, a thrust ring and a thrust plate,
wherein the threaded socket
has a cylindrical section arranged coaxially with an axis perpendicular to the plane of the membrane,
is fixedly or detachably connected to the membrane,
on the outside of the circumferential surface of its cylindrical section has a socket male thread, and
on the inside of the circumferential surface of its cylindrical section has a socket female thread,
wherein the thrust ring
has a cylindrical portion arranged coaxially with the cylindrical portion of the threaded socket, and
on the inner side of the circumferential surface of its cylindrical section has a thrust ring female thread which is formed as a mating thread to the socket male thread of the threaded socket,
wherein the thrust plate
has a cylindrical section arranged coaxially with the cylindrical section of the threaded socket,
on the outside of the circumferential surface of its cylindrical portion, has a thrust plate male thread formed as a mating thread to the socket female thread of the threaded socket, and
on the inside of the circumferential surface of its cylindrical portion, a thrust plate female thread adapted to be connected to the male thread at an end portion of a drive shaft of a membrane pump, wherein the thrust plate male thread of the thrust plate and the socket female thread of the threaded socket formed as a mating thread thereof have a different thread pitch, a different thread rotation direction, or both a different thread pitch and a different thread rotation direction than the thrust ring female thread of the thrust ring and the socket male thread of the threaded socket formed as a mating thread thereof, and
wherein the thrust plate can be connected or is connected to the thrust ring in a torque-proof manner via a connecting section.

2. The membrane system according to claim 1, wherein the thrust plate has one or more connecting sections including at least the connecting section extending radially outwardly from an end of its cylindrical section facing away from the membrane, wherein the connecting section extends at least as far as the thrust ring or beyond its end facing away from the membrane.

3. The membrane system according to claim 1, wherein at the thrust plate
the connecting section is provided which extends radially outwardly from the cylindrical section of the thrust plate in the form of a circular disc, or
two or more connecting portions are provided which are formed as webs or tabs extending radially outwardly from the cylindrical portion of the thrust plate.

4. The membrane system according to claim 1, wherein the torque-resistant connection of the thrust plate to the thrust ring is an adhesive connection, a welded connection, a bolt connection, a form-fit connection, a snap-in connection or a combination of two or more of the aforementioned connections.

5. The membrane system according to claim 1, wherein the thrust ring has at least one cutout or groove open in the direction of the thrust plate.

6. The membrane system according to claim 1, wherein the threaded socket is manufactured integrally with the membrane from the same material.

7. The membrane system according to claim 1, wherein the membrane is made of polytetrafluoroethylene (PTFE) and/or the threaded socket is made of polytetrafluoroethylene (PTFE) and/or the thrust ring is made of polyphenyl ether (PPE) or a derivative thereof or of a polymer blend containing polyphenyl ether (PPE) or a derivative thereof or of a polymer alloy containing polyphenyl ether (PPE) or a derivative thereof, and/or the thrust plate is manufactured from metal or a metal alloy.

8. The membrane system according to claim 1, wherein the membrane system further comprises at least one bolt or securing pin extending through a connecting portion of the thrust plate, preferably through through-holes in the connecting portion of the thrust plate, into the cylindrical portion of the threaded socket.

9. A membrane pump for conveying a fluid, comprising a membrane system according to claim 1 and a drive shaft adapted for oscillating translatory movement perpendicular to the plane of the membrane during operation of the membrane pump and having an external thread at an end portion for engagement with the membrane system by screwing.

\* \* \* \* \*